(No Model.) 2 Sheets—Sheet 1.
C. A. BARTLIFF.
BEER PUMP.
No. 457,243. Patented Aug. 4, 1891.
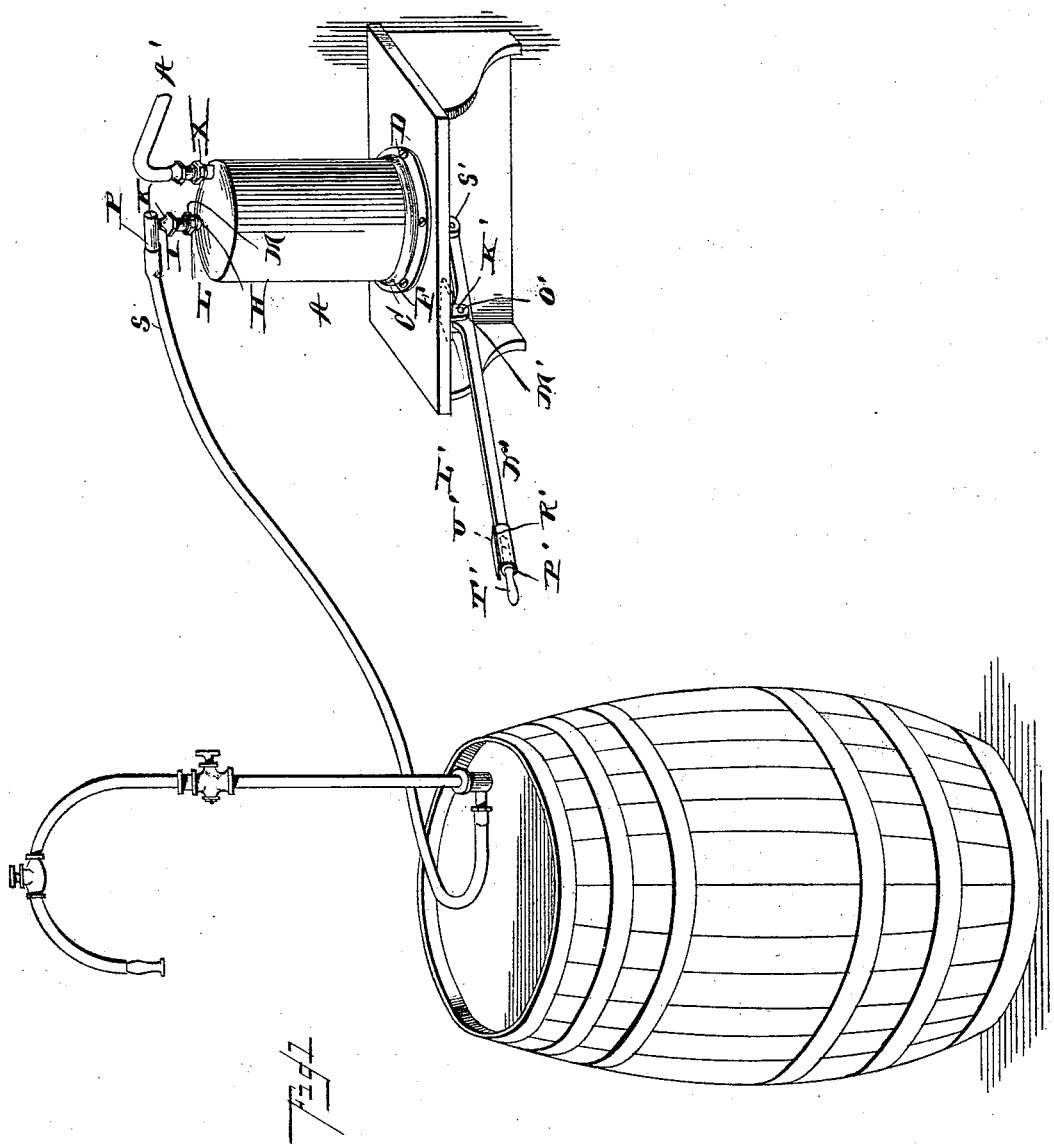
Witnesses
John Imirie
J. W. Garner
Inventor
Charles A. Bartliff
By his Attorneys

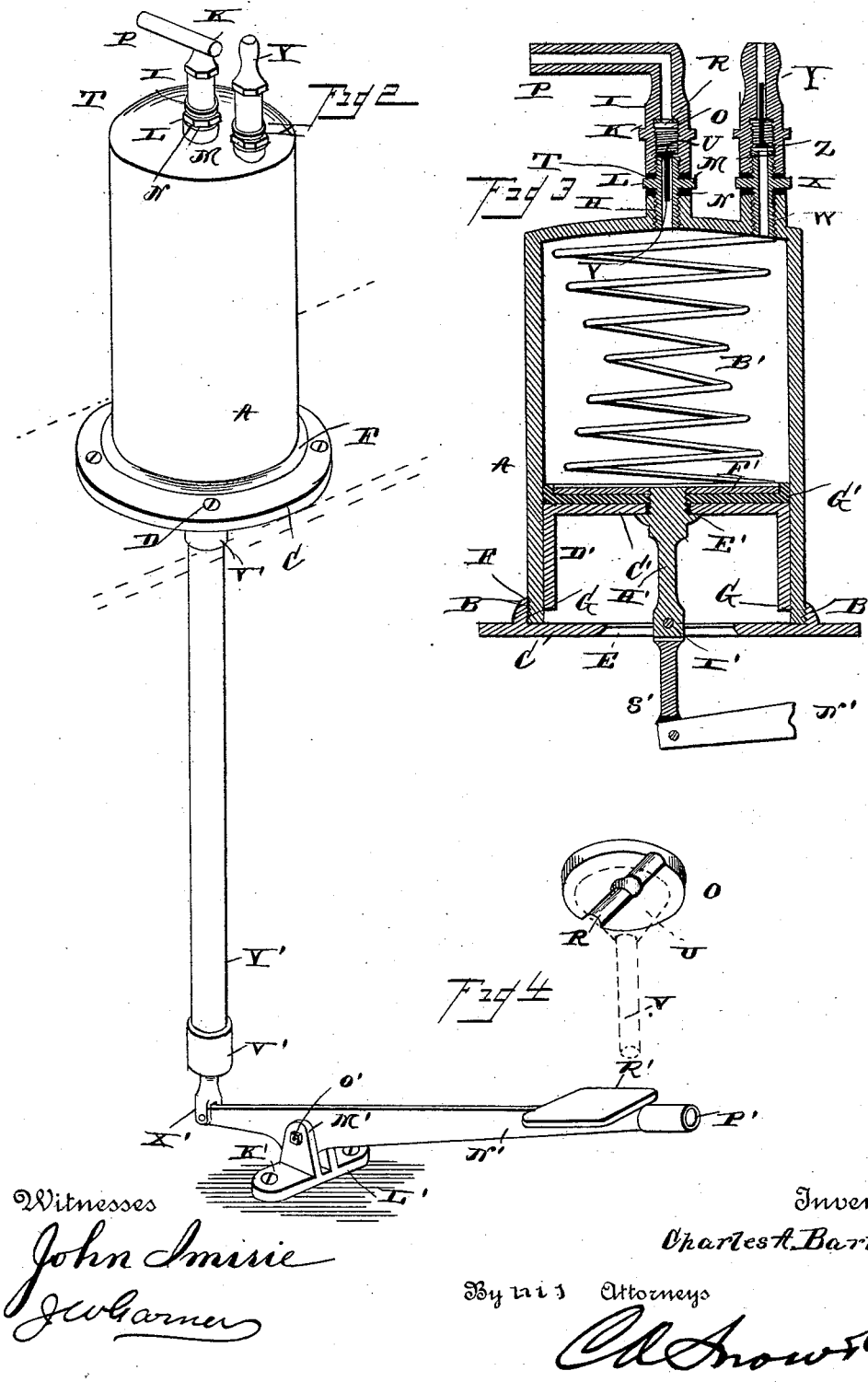

UNITED STATES PATENT OFFICE.

CHARLES A. BARTLIFF, OF MEMPHIS, TENNESSEE.

BEER-PUMP.

SPECIFICATION forming part of Letters Patent No. 457,243, dated August 4, 1891.

Application filed March 8, 1889. Serial No. 302,461. (No model.)

*To all whom it may concern:*

Be it known that I, CHARLES A. BARTLIFF, a citizen of Canada, residing in Memphis, in the county of Shelby and State of Tennessee, have invented a new and useful Improvement in Beer-Pumps, of which the following is a specification.

My invention relates to an improvement in air-pumps for forcing and compressing air in a cask; and it consists in the peculiar construction and novel combination of parts, that will be more fully set forth hereinafter, and particularly pointed out in the claim.

The object of my invention is to provide an air-pump which is adapted to force beer or other liquid from the cask by atmospheric pressure; and a further object of my invention is to provide a simple, effective, and inexpensive pump which may be operated either by foot or by hand power.

In the accompanying drawings, Figure 1 is a perspective view of my improved air-pump when arranged to be operated by hand. Fig. 2 is a similar view of the same, showing the pump arranged to be operated by foot. Fig. 3 is a vertical sectional view of my improved air-pump. Fig. 4 is a detail view of one of the vertically-perforated and transversely-grooved blocks O seated in the valve-casings, showing the same in perspective from the under side and showing in dotted lines one of the valves U in contact therewith.

A represents the cylinder of the pump, which has its upper end closed and its lower end open, and is provided at its lower end with exterior screw-threads B.

C represents a base-ring, which is provided with a series of openings D, through which screws may be passed to secure the base-ring on a shelf, bracket, counter, or other suitable support. By this means the pump may be supported at any suitable height above the floor, where it will be out of the way of dust and dirt and where it will not become rusted from wet and dampness. In the center of the said base-ring is a circular opening E, which is of much less diameter than the cylinder, and concentric with the said opening is an annular flange F, which is provided with internal screw-threads G, adapted to be engaged by the threads B of the pump-cylinder, whereby the latter may be readily secured to or disconnected from the base. The base-ring remains at all times secured to the shelf, bracket, or counter; but if it be desired to remove the cylinder in order to obtain access to the working parts of the pump for the purpose of making repairs this can be readily accomplished in a moment by unscrewing the cylinder from the base-ring, as will be readily understood. In the upper end of the cylinder, at the center of the same, is a screw-threaded outlet-opening H.

I represents an outlet-valve case, which is composed of two members K L. The lower member L has a depending threaded spindle which engages the threaded opening H, and has a central angular portion M, which is adapted to be engaged by a wrench. A washer N is fitted on the said spindle, and is clamped between the upper side of the cylinder and the lower side of the angular portion M, and thereby a perfectly air-tight joint is effected between the lower section of the valve-case and the cylinder. The lower section of the valve-case has on its upper side a threaded spindle, which is adapted to engage a threaded counterbore in the lower end of the upper section K. In the upper end of the said counterbore is fitted a block O, which has a vertical central opening that communicates with the bore of a right-angled nipple P, that projects from the upper end of the upper section, and said block is provided on its lower side with a transverse concave groove R, which communicates with the central vertical opening. S represents a discharge-pipe, which is attached to the nipple P. A washer T is secured on the upper spindle of the lower section of the valve-case, and is compressed between the angular portion N thereof and the lower edge of the upper section K, so as to effect a perfectly air-tight joint between the said upper and lower sections of the valve-case. In the counterbore of the upper section is arranged an inverted conical valve U, which is made of rubber or other suitable elastic material, and is provided with a depending guiding stem or arm V, which is inserted in the bore of the lower section of the valve-case and serves to guide the valve upward and downward in the valve-case, so as to cut off communication between the pipe S and the interior of the cylinder when the valve is lowered and to open communication between said pipe and cylinder when the valve is raised, as will be very readily understood.

On one side of the upper end of the cylinder is a threaded opening W, in which is secured an inlet-valve case X, which is similar to the valve-case I, with the exception that its nipple Y is vertical instead of being arranged in the form of a right angle, and its valve Z is arranged with its arm upward, so that the said valve is adapted to open communication between the inlet-pipe A' and the interior of the cylinder and to cut off communication between the same when the valve is raised. The inlet and outlet valves thus constructed are automatic in operation and do not require the use of springs to make them effective, and hence they cannot readily get out of order. If from any cause the inlet-valve should fail to work, there will be no possibility of any portion of the contents of the cask being sucked into the pump-cylinder, and hence that danger is obviated. Should the inlet-valve become deranged, the air-pressure on the piston will be so great that it will be nearly impossible to work the lever, and the operater would be thus apprised that something was amiss.

The pressure in the cask after the pump has been operated closes the outlet-valve, and the latter is thus caused to act as a gate and to effectually prevent the escape of air and gas from the cask.

B' represents a helical spring, which has its upper end fitted in the upper end of the cylinder.

C' represents a piston or plunger, which fits in the cylinder and is adapted to reciprocate therein in a vertical direction. Said piston or plunger has its lower side hollow, so as to provide it with a depending annular flange D', and in the upper end of the plunger is a central circular opening E'.

F' represents a circular disk, which is of somewhat less diameter than the piston or plunger and is provided with a vertical threaded central opening. A packing-disk G', which is made of leather or other suitable flexible material, is inserted between the plunger and the disk F', the latter being arranged above the top of the plunger.

H' represents a piston-rod, which has a threaded stem at its upper end, which passes through the opening E' in the upper end of the plunger and engages a threaded opening in the center of the disk F', and thereby serves to secure said disk above the plunger and the disk. In the lower end of the piston-rod, which is flattened on opposite sides, is a transverse opening I'. The lower end of the spring B' bears upon the upper side of the disk F', and thereby the said spring normally forces the plunger downward in the cylinder, the base-plate C forming the lower limit of the motion of the plunger.

K' represents a bracket, which comprises the base-plate L' and a pair of ears M', arranged at right angles thereto and parallel to each other. Said bracket is adapted to be secured either to the under side of the bracket, counter, or shelf on which the cylinder is supported or upon the floor at a point nearly under the said cylinder, and between the ears of the said bracket is fulcrumed a lever N' by means of a pin or bolt O', which passes through openings in the said lever and in the said ears. One end of the lever is provided with a socket P', which is cylindrical in form, and has on its upper side a broadened flat portion R', which forms a pedal.

S' represents a link, which is adapted to be pivoted to the lower end of the piston-rod and to the inner end of the lever. The ends of said link are forked and thereby adapted to receive the ends of said piston-rod and lever, and are further provided with transverse openings, which are adapted to align with the similar openings in the ends of the lever and piston-rod and to receive suitable pivotal pins or bolts, as will be readily understood. This link is only used to connect the lever to the piston-rod when the pump is arranged as illustrated in Fig. 1, and is adapted to be operated by hand, in which case the handle T', which is made of wood, has its spindle U' at one end inserted in the socket p', thereby causing the handle to form an extension of the lever.

V' represents a pair of sockets provided each with a pair of ears X', which are similar to the ears formed at the ends of links S'. When the pump is arranged to be operated by foot-power, the link S' is dispensed with, the sockets V' pivotally connected to the inner end of the lever and of the lower end of the piston-rod, and a link Y' has its ends inserted in the said sockets, and thereby downward pressure on the outer end of the lever will cause the inner end thereof to force the link upward, so as to move the plunger or piston upward in the cylinder against the tension of the spring B'.

The operation of my invention is as follows: The outer end of the outlet-pipe S is attached to a nipple on a bung, which is driven into the top of a cask. At each downward stroke of the plunger in the cylinder air is drawn into the cylinder through the pipe Z and the inlet-valve X, and at each upward stroke of the plunger the air is forced through the pipe S, through the bung into the cask above the liquid contents thereof, and thereby air is compressed in the said cask in sufficient quantities after a few strokes of the plunger to cause the liquid contents of the cask to be forced from the faucet.

From the foregoing description it will be understood that the contents of the cask never come in contact with the pump, and hence the quality of the said contents of the cask cannot become impaired by the use of the pump. The air-inlet pipe may extend to any point from which pure fresh air may be obtained, hot or cold, as desired. When my pump is used for forcing the beer from a cask, it will be found of great utility in cases where a portion of the beer is unsold and has to remain in the cask over night. As in such case the pump may be operated for a sufficient length of time to cause the quantity of air to become compressed in the cask on the contents thereof and thereby prevent the carbonic-acid gas from escaping from the beer, and consequently preventing the same from becoming stale or flat before morning.

Having thus described my invention, I claim—

The combination of the cases, the valves seated therein, and the blocks mounted in the valve-cases and having perforations registering with the fluid-passages and provided with transverse grooves in the sides facing the valves, substantially as and for the purpose set forth.

In testimony that I claim the foregoing as my own I have hereto affixed my signature in presence of two witnesses.

CHAS. A. BARTLIFF.

Witnesses:
LONSFORD W. MURRAY,
L. E. WOOTEN.